United States Patent [19]

Weldy

[11] Patent Number: 5,210,623
[45] Date of Patent: May 11, 1993

[54] APPARATUS AND METHOD FOR QUANTIZING AND/OR RECONSTRUCTING MULTI-DIMENSIONAL DIGITAL IMAGE SIGNALS

[75] Inventor: John A. Weldy, Rochester, N.Y.

[73] Assignee: Eastman Kodak Company, Rochester, N.Y.

[21] Appl. No.: 454,551

[22] Filed: Dec. 21, 1989

[51] Int. Cl.$^5$ .............................................. H04N 1/40
[52] U.S. Cl. ................................... 358/458; 358/447; 358/456; 358/463
[58] Field of Search ................. 341/200; 358/445, 447, 358/465, 466, 429, 458, 462, 463, 456; 375/26, 17

[56] References Cited

U.S. PATENT DOCUMENTS

| | | | |
|---|---|---|---|
| 4,222,076 | 9/1980 | Knowlton | 358/429 |
| 4,231,100 | 10/1980 | Eggermont | 375/26 |
| 4,468,790 | 8/1984 | Höfelt | 375/26 |
| 4,821,334 | 4/1989 | Ogino et al. | 358/458 |
| 4,858,017 | 8/1989 | Torbey | 358/426 |
| 4,862,173 | 8/1989 | Nishitani | 375/26 |
| 4,908,876 | 3/1990 | DeForest et al. | 382/6 |
| 4,926,268 | 5/1990 | Kawamura et al. | 358/456 |
| 4,969,204 | 11/1990 | Melnychuck et al. | 382/49 |
| 5,008,672 | 4/1991 | Leedy | 341/200 |

*Primary Examiner*—Edward L. Coles, Sr.
*Assistant Examiner*—Thomas L. Stoll
*Attorney, Agent, or Firm*—Edward Dugas

[57] ABSTRACT

The method and apparatus of the present invention performs the quantization, sampling, and final digital image signal reconstruction in a way that reduces quantization artifacts such as contouring while retaining desired spatial (temporal) frequency response and resolution. The technique of the present invention features a spatially varying quantization step, a low pass filtering step, a second spatially varying quantization step, and a comparison step to determine the reconstructed signal.

21 Claims, 8 Drawing Sheets

FIG. 1

ONE-DIMENSIONAL SIGNAL SPATIALLY (TEMPORALLY)
VARYING QUANTIZED BY A FACTOR OF TWO

USE QUANTIZER → A B A B A B A B

FOR SAMPLE # → 0 1 2 3 4 5 6 7

FIG. 2

TWO-DIMENSIONAL SIGNAL SPATIALLY VARYING
QUANTIZED BY A FACTOR OF TWO

Y COORDINATE

| 4 | A B A B A B A B |
| 3 | B A B A B A B A |
| 2 | A B A B A B A B |
| 1 | B A B A B A B A |
| 0 | A B A B A B A B |

X COORDINATE → 0 1 2 3 4 5 6 7

IF X+Y=EVEN, USE QUANTIZER A

IF X+Y=ODD, USE QUANTIZER B

FIG. 3

TWO-DIMENSIONAL SIGNAL SPATIALLY VARYING
QUANTIZED BY A FACTOR OF FOUR

Y COORDINATE

| 4 | A B A B A B A B |
| 3 | C D C D C D C D |
| 2 | A B A B A B A B |
| 1 | C D C D C D C D |
| 0 | A B A B A B A B |

X COORDINATE → 0 1 2 3 4 5 6 7

IF X=EVEN AND Y=EVEN USE QUANTIZER A

IF X=ODD AND Y=EVEN USE QUANTIZER B

IF X=EVEN AND Y=ODD USE QUANTIZER C

IF X=ODD AND Y=ODD USE QUANTIZER D

FIG. 4

ALTERNATE TWO-DIMENSIONAL SIGNAL SPATIALLY VARYING QUANTIZED BY A FACTOR OF FOUR

Y COORDINATE

```
4    A B D C A B D C
3    D C A B D C A B
2    A B D C A B D C
1    D C A B D C A B
0    A B D C A B D C
```

X COORDINATE → 0 1 2 3 4 5 6 7

FIG. 5

ONE-DIMENSIONAL SIGNAL SPATIALLY VARYING QUANTIZED BY A FACTOR OF 1.5

USE QUANTIZER →   A B A C A B A C

FOR SAMPLE # →   0 1 2 3 4 5 6 7

FIG. 6

TWO-DIMENSIONAL SIGNAL, WITH 3 QUANTIZERS, SPATIALLY VARYING QUANTIZED BY A FACTOR OF 1.5

Y COORDINATE

```
4    A C A C A C A C
3    B A B A B A B A
2    A C A C A C A C
1    B A B A B A B A
0    A C A C A C A C
```

X COORDINATE → 0 1 2 3 4 5 6 7

FIG. 7

TWO-DIMENSIONAL SIGNAL SPATIALLY VARYING
QUANTIZED BY A FACTOR OF FIVE

Y COORDINATE

```
4    A B C D E A B C
3    D E A B C D E A
2    B C D E A B C D
1    E A B C D E A B
0    C D E A B C D E
```

X COORDINATE → 0 1 2 3 4 5 6 7

FIG. 8

TWO-DIMENSIONAL SIGNAL SPATIALLY VARYING
QUANTIZED BY A FACTOR OF THREE

Y COORDINATE

```
4    A B C A B C A B
3    C A B C A B C A
2    B C A B C A B C
1    A B C A B C A B
0    C A B C A B C A
```

X COORDINATE → 0 1 2 3 4 5 6 7

FIG. 9

SPATIAL SAMPLING PATTERN (EVERY OTHER COLUMN OFFSET
ONE HALF THE SAMPLING INTERVAL) FOR A TWO-DIMENSIONAL
SPATIALLY VARYING QUANTIZED BY A FACTOR OF 3

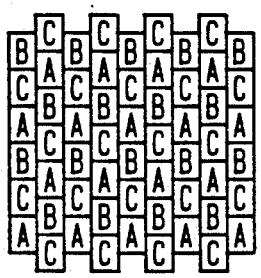

FIG. 12

| I | II | III | IV | V | VI | VII | VIII | IX | X | XI | XII | XIII | XIV |
|---|---|---|---|---|---|---|---|---|---|---|---|---|---|
| ORIGINAL SIGNAL (OS) | QUANT. A | QUANT. B | QUANT. SIGNAL (QS) | OS−QS | LOW-PASS QS (QSLP) ① | OS−QSLP | REQUANTIZE QSLP A | B (RQ) | A≠B AGB | IF RQ=QS US QSLP | ELSE USE QS | QSLP OR QS (SVQ) | OS−SVQ |
| 1 | 0 | 0 | 0 | 0 | 2 | −2 | | | 2 | 0 | 0 | 0 | 0 |
| 0 | 6 | 4 | 6 | −1 | 4 | −3 | 4 | 6 | 4 | 6 | 6 | 6 | −1 |
| 7 | 6 | 2 | 4 | 1 | 5 | −2 | 4 | 4 | 6 | | 4 | 4 | 1 |
| 3 | 4 | 6 | 6 | 0 | 4 | −1 | 4 | 6 | 4 | | 6 | 6 | 0 |
| 6 | 2 | 2 | 2 | 0 | 4 | −2 | 2 | 2 | 6 | 4 | 2 | 2 | 0 |
| 2 | 2 | 4 | 4 | 0 | 5 | 0 | 2 | 4 | 2 | 5 | | 5 | 0 |
| 4 | 2 | 4 | 6 | 0 | 3 | 1 | 2 | 4 | 2 | 3 | | 3 | 1 |
| 5 | 2 | 2 | 2 | 1 | 3 | 1 | 2 | 4 | 4 | 3 | | 3 | 1 |
| 2 | 2 | 4 | 4 | −1 | 3 | −1 | 2 | 4 | 2 | 3 | | 3 | −1 |
| 2 | 2 | 2 | 2 | 0 | 3 | 0 | 2 | 2 | 2 | 3 | | 3 | 0 |
| 2 | 2 | 2 | 2 | 0 | 3 | 0 | 2 | 2 | 4 | 3 | | 3 | 0 |
| 3 | 2 | 4 | 4 | −1 | 3 | 0 | 2 | 4 | 2 | 3 | | 3 | 0 |
| 3 | 4 | 4 | 4 | −1 | 3 | 0 | 4 | 4 | 4 | 3 | | 3 | 0 |
| 3 | 4 | 6 | 4 | −1 | 4 | −1 | 4 | 4 | 4 | 4 | | 4 | −1 |
| 5 | 6 | 6 | 6 | −1 | 5 | 0 | 4 | 6 | 4 | 5 | | 5 | 0 |
| 6 | 6 | 6 | 6 | 0 | 6 | 0 | 6 | 6 | 6 | 6 | | 6 | 0 |
| 6 | | | 6 | 0 | 6 | 0 | | | 6 | 6 | | 6 | 0 |

AVERAGE ABSOLUTE VALUE ERROR → .500, .722, .278
MEAN SQUARED ERROR → .707, 1.179, .527

① LOW-PASS FILTER = [1/4, 1/2, 1/4]. RESULTS OF FILTERING ROUNDED TO NEAREST INTEGER VALUE

APPARATUS AND METHOD FOR QUANTIZING AND/OR RECONSTRUCTING MULTI-DIMENSIONAL DIGITAL IMAGE SIGNALS

RELATED PATENT APPLICATIONS

This application is related to U.S. patent applications: Ser. No. 442,872 entitled "A HYBRID RESIDUAL-BASED HIERARCHICAL STORAGE AND DISPLAY METHOD FOR HIGH RESOLUTION DIGITAL IMAGES IN A MULTIUSE ENVIRONMENT", filed on Nov. 29, 1989 now U.S. Pat. No. 4,969,204;

Ser. No. 432,293 entitled "A HIERARCHICAL STORAGE AND DISPLAY METHOD FOR HIGH RESOLUTION DIGITAL IMAGES IN A MULTI-USE ENVIRONMENT", filed on Nov. 6, 1989 now U.S. Pat. No. 5,048,111; and Ser. No. 455,107 entitled "METHODS FOR REDUCING QUANTIZATION ERROR IN HIERARCHICAL DECOMPOSITION AND RECONSTRUCTION SCHEMES" filed on Dec. 22, 1989, now U.S. Pat. No. 5,020,120.

TECHNICAL FIELD OF THE INVENTION

The present invention is directed to the field of image processing and more particularly to apparatus and methods for quantizing and/or reconstructing multi-dimensional digital image signals.

BACKGROUND OF THE INVENTION

A necessary step in creating digitized image signals from analog sources is the quantizing, or sampling of the dynamic range, of these image signals into discrete levels. In addition, spatial (or temporal) sampling is also performed. Given limited resources for storing, transmitting, reproducing, processing, or otherwise manipulating a digitized image signal, it is desirable to reduce the spatial resolution and/or the number of quantization levels (dynamic range resolution). Reducing the spatial resolution reduces the frequency response of the digital image signal, while reducing the number of quantization levels results in contouring and other reproduction artifacts.

It is well know from an article entitled "PCM Encoded NTSC Color Television Subjective Tests" by A. A. Golberg, JSMPTE August, 1973, p.p. 649-654 that a square wave or random signal can be added to a signal before quantizing to reduce the contouring that can result from this quantizing and then a subsequent low pass filtering of this combined signal can be performed to reduce the visibility of the quantization noise. This technique has been described in various prior art publications, for example, see U.S. Pat. No. 4,825,285 entitled "HYBRID ENCODER", by Speidel et al. wherein it is noted that the low pass filtering operation yields a lack of picture definition which is however, less disturbing than the above mentioned disturbances caused by quantization errors.

A patent of particular interest for building on the aforementioned article is U.S. Pat. No. 4,334,237 entitled "ADAPTIVE AMPLITUDE AVERAGING FOR WEIGHTING QUANTIZING NOISE" by Reimeier et al. wherein a method and an apparatus are disclosed for determining if only low frequency information is present. This method and apparatus are used to determine when this low pass filtering operation should be performed. In the detailed description of this method and apparatus it is noted that in the case where the averaging or integration is performed (i.e. the low pass filtering operation), that the maximum error is one half of the quantizing step. It is further noted that in areas of high frequency information that the maximum error is increased to one and one-half of a quantizing step since the signal, which by virtue of the disclosed method has a one half quantization level magnitude square wave added to it, is not averaged.

SUMMARY OF THE INVENTION

In the preferred method and apparatus of the invention an input digital image signal is first formed into a multi-leveled quantized digital image signal, which is then reduced in the number of quantization levels by a further quantizing step in a spatially varying manner. The reduced level quantized digital image signal may then be stored and/or transmitted. Upon retrieval, the stored or transmitted digital image signal is reconstructed in a manner that increases the number of reproduced levels.

From the foregoing, it can be seen that it is a primary object of the present invention to provide an improved method and apparatus for quantizing and/or reconstructing multi-dimensional digital image signals.

It is another object of the present invention to provide an improved method and apparatus for reducing quantization and/or reconstruction artifacts in multi-dimensional digital image signals.

It is yet another object of the present invention to provide an improved method and apparatus for performing quantization and/or reconstruction of digital image signals with the average number of quantization levels being other than positive integral powers of two.

It is a further object of the present invention to provide an improved method and apparatus for reducing any additional error injected into the high frequency information as a result of previously utilized techniques used to reduce the error in the low frequency information.

The above and other objects of the present invention will become more apparent when taken in conjunction with the following description and drawings wherein like characters indicate like parts and which drawings form a part of the present description.

BRIEF DESCRIPTION OF THE DRAWINGS

FIG. 1 is a table that illustrates a relationship between different quantization and sample number.

FIG. 2 is matrix illustrating a relationship between quantization and the x and y coordinates of a two-dimensional sampling scheme.

FIG. 3 is another matrix illustrating a relationship between quantization and the x and y coordinates of a two-dimensional sampling scheme.

FIG. 4 is yet another matrix illustrating a relationship between quantization and the x and y coordinates of a two-dimensional sampling scheme.

FIG. 5 is another table that illustrates a relationship between different quantization with and number.

FIG. 6 is yet another matrix illustrating a relationship between quantization and the x and y coordinates of a two-dimensional sampling scheme.

FIG. 7 is yet another matrix illustrating a relationship between quantization and the x and y coordinates of a two-dimensional sampling scheme.

FIG. 8 is yet another matrix illustrating a relationship between quantization and the x and y coordinates of a two-dimensional sampling scheme.

FIG. 9 is a two-dimensional sampling pattern illustrating a relationship between quantization and a two-dimensional sampling scheme.

FIG. 12 is a table illustrating typical results of operating the preferred apparatus and method under varying signal conditions.

DETAILED DESCRIPTION OF THE PREFERRED EMBODIMENTS OF THE INVENTION

Figure 10:
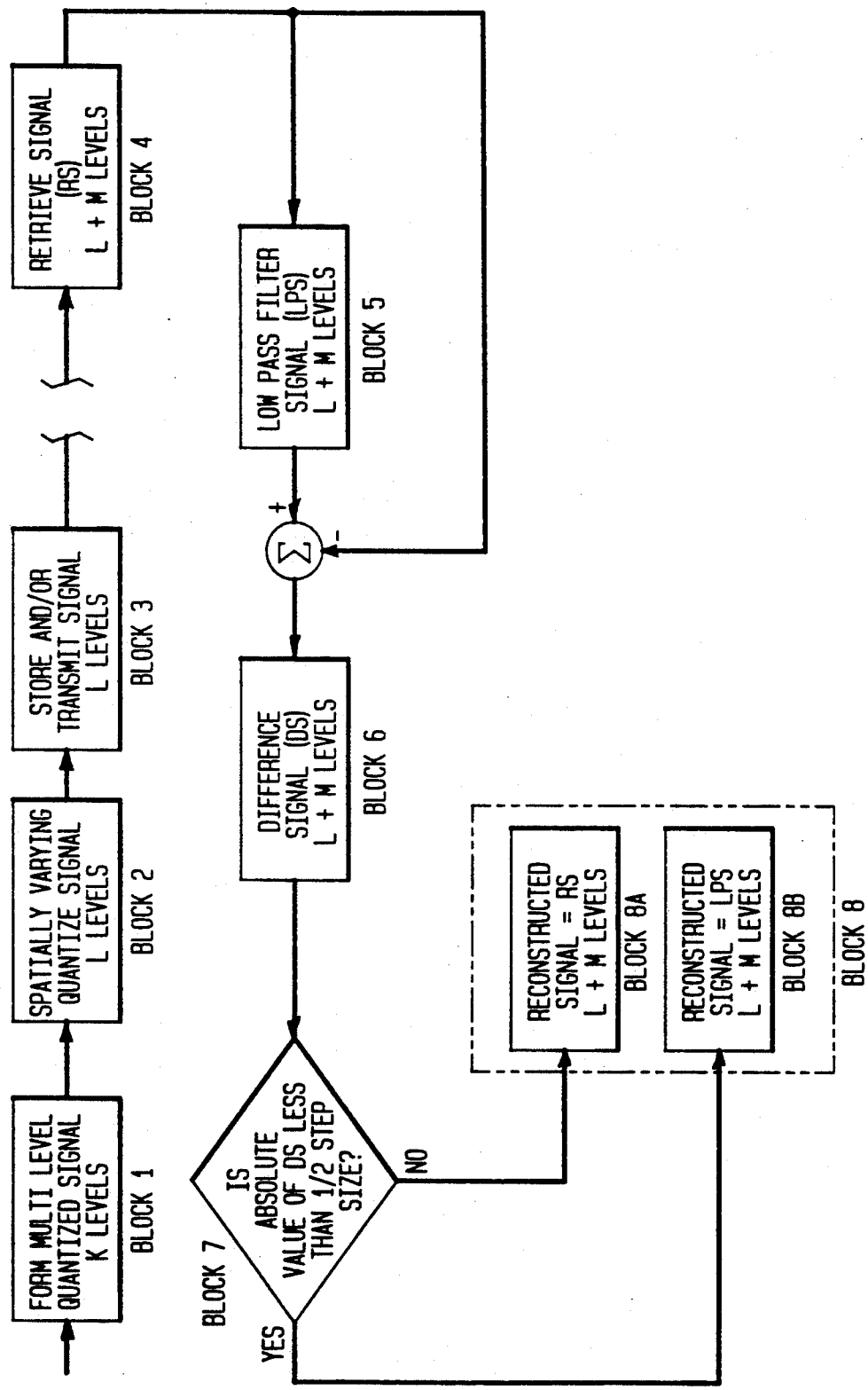
FIG. 10 is a process flow block diagram illustrating a quantization reconstruction method.

The description that follows is divided into major sections. Section 1 deals with the method used to quantize a digital image signal, section 2 deals with the method used to reconstruct this digital image signal in a way that reduces the errors that have resulted from this quantizing process, and section 3 deals with apparatus used to quantize and reconstruct a digital image signal.

The method and apparatus of the present invention are described as utilizing one-dimensional and two-dimensional single channel digital image signals. The description of the technique is sufficient for those skilled in the art, to apply this technique to multichannel digital image signals (such as the red, green, and blue images in a color digital image signal) and to digital image signals with greater than two spatial dimensions. The technique that follows could be applied to residual decomposed, transform decomposed, subband decomposed, or other decomposed images as part of a hierarchical decomposition schemes such as the types disclosed in the applications referenced under the heading RELATED PATENT APPLICATIONS.

SECTION 1

Quantization Methods

Quantization may be performed to achieve data load benefit (for data storage or compression) or could be required if a display device has fewer dynamic range levels than the signal being sent to it. The method developed below applies to both of these scenarios. While the method and apparatus described below illustrate examples wherein a quantized signal is more coarsely quantized, those skilled in the art should note that this method and apparatus could also be applied to the original quantization of digital image signal with a continuous dynamic range.

The quantization method where a $2^N$ level original signal is quantized to $2^{N-1}$ levels is illustrated in the Table I below. Note that the original signal has $2^N$ levels corresponding to N bits. The different quantizer options individually have $2^{N-1}$ levels. While combinations of these various $2^{N-1}$ quantizers may include all $2^N$ levels from the original signal, using only one quantizer option for each sample location will yield a quantized digital image signal with only $2^{N-1}$ levels possible at each sample location.

TABLE I

| | Dynamic Range Values | | | | | | | |
|---|---|---|---|---|---|---|---|---|
| Original Signals | 0 | 1 | 2 | 3 | 4 | 5 | 6 | 7 | 8 etc. |
| Quantized Signals | | | | | | | | | |
| Option A | 0 | 0 | 2 | 2 | 4 | 4 | 6 | 6 | 8 etc. |
| Option B | 0 | 2 | 2 | 4 | 4 | 6 | 6 | 8 | 8 etc. |
| Option C | 0 | 1 | 1 | 3 | 3 | 5 | 5 | 7 | 7 etc. |
| Option D | 1 | 1 | 3 | 3 | 5 | 5 | 7 | 7 | 9 etc. |

Any of the above four quantizer options could be applied to quantize a digital image signal by a factor of 2 ($2^N$ levels are reduced to $2^{N-1}$ levels). It is well known in the art that the mean squared error between the original and quantized signals can be reduced if the quantized values equal to the average of the values of the original signal that are quantized to these quantization values as shown in quantizer Options E and F:

| Option E | 0.5 | 0.5 | 2.5 | 2.5 | 4.5 | 4.5 | 6.5 | 6.5 | 8.5 etc. |
| Option F | −0.5 | 1.5 | 1.5 | 3.5 | 3.5 | 5.5 | 5.5 | 7.5 | 7.5 etc. |

Often these average values (which are N+1 bit or half level resolution) are not achievable.

The concept of "overlapping" quantizers can be gleaned from Table I. Options A and B form a pair of overlapping quantizers. Overlapping is used to describe the fact that in the case of Option A, original digital image signal values of 1 and 2 map to a value of 2 and in the case of Option B, original digital image signal values of 2 and 3 map to a value of 2. In other words, a quantized digital image signal with a value of 2 could correspond to a original digital image signal value of 1 or 2, or 2 or 3, depending on whether the Option A or Option B quantizer was used.

Spatially varying quantizing by a factor of 2 can be performed by utilizing two of the quantizer Options (A, B, C, or D) in regular varying spatial patterns as described in the examples below. More sophisticated methods with level dependent and/or adaptive quantization could also be considered, but are not included in the current embodiment. The following examples show how different combinations of these quantizer Options can be implemented. Note that in some of the examples the quantization tables or information to reconstruct these tables and/or information describing the varying spatial pattern by which these tables are implemented may need to be passed to the reconstruction method.

Examples illustrating quantizing by factors equal to positive integral powers of two:

EXAMPLE 1 (FIG. 1)

One-Dimensional Digital Image Signal Quantized By a Factor of 2

FIG. 1 illustrates a quantization method wherein the Option A quantizer is used at even-indexed sample locations and the Option B quantizer is used at odd-indexed sample locations.

Note that the average quantization values, which are determined by averaging Option A values and Option B values are equal to the original digital image signal values. This means that, on the average (or at lower spatial frequencies), $2^N$ levels are preserved by utilizing these two $2^{N-1}$ level quantizers in this spatially varying method. This is achieved by the overlapping feature of these two Options. Equivalent results are achieved by:
For even-indexed samples use quantizer—Option C
For odd-indexed samples use quantizer—Option D
Again, on the average, $2^N$ level information is preserved since Option C and Option D form a pair of overlapping quantizers. For these first two cases, a simple reconstruction method, wherein the values are displayed at their quantization level values, will produce a dither pattern that will tend to conceal contouring that might occur if overlapping quantizers were not used. Since Options A and B have the same $2^{N-1}$ values and Options C and D have the same (different from Options A and B) $2^{N-1}$ values, a $2^N$ level playback device would not benefit from and therefore not need, any knowledge of the spatially varying quantizer pattern. As will be described in Section 2, more than $2^{N-1}$ levels can be created from a digital image signal quantized to $2^{N-1}$ levels by using more sophisticated image reconstruction methods.

Other options, for example, Option B with Option D and Option A with Option C, preserve the overlapping quantizer concept. Since all $2^N$ values are used, this combination may have advantage if $2^{N-1}$ level signal is to be reconstructed with $2^N$ level playback device and no additional reconstruction processing, such as that disclosed below, is implemented. However, the playback device would need to know how the quantizers were spatially varied in the quantization method. Again, these combinations of various Options of $2^{N-1}$ quantizers may include all $2^N$ values from the original signal; however, using only one $2^{N-1}$ level quantizer option for each sample location will yield a quantized digital image signal with $2^{N-1}$ levels.

The remaining options, Option A with Option D and Option B with Option C would give the appropriate average quantization values and would use all $2^N$ levels in a $2^N$ level reconstruction. Note that the averages of Option A and Option D values are the Option E values and the averages of Option B and Option C values are the Option F values. These two combinations reflect quantization with a single quantizer (since they are not overlapping) and playback with two spatially varying reconstruction tables with different $2^{N-1}$ level values to cover all $2^N$ levels.

Those skilled in the art will note that example 1 could alternatively be implemented with a single quantizer such as Option A after a square wave dither signal with maximum magnitude equal to the original image signal quantization step size has been added to the digital image signal. In the present invention the spatially varying quantizing method and apparatus are described since examples, where the number of quantization levels varies among the spatially varying quantizers, could not be easily implemented by adding a dither signal.

Furthermore, those skilled in the art should recognize that applying overlapping quantizers in a spatially varying random manner is an alternative implementation of methods described in the art wherein a random signal of maximum magnitude equal to the original quantization step size is added to a digital image signal.

EXAMPLE 2 (FIG. 2)

Two-dimensional Digital Signal Image Quantized by a Factor of 2

The method in Example 1 may be implemented in a constant row or constant column manner for a two-dimensional digital image signal; however, better performance can be achieved by spatially varying the two quantizers in a checkerboard manner:

FIG. 2 illustrates this method wherein sample locations where the sum of the sample indices in both dimensions or pixel coordinates is odd use the Option A quantizer and for sample locations where the sum of the sample indices in both dimensions or pixel coordinates is even use the Option B quantizer.

As with Example 1 other combinations of quantizers could be used.

EXAMPLE 3 (FIG. 3)

Two-dimensional Digital Image Signal Quantized by a Factor of 4

The quantization method where a $2^N$ level original signal is quantized to $2^{N-2}$ levels is illustrated in the Table II below. Note that the original signal has $2^N$ levels corresponding to N bits.

In this example the original image is quantized by a factor of 4 to produce four overlapping quantizers in a manner similar to that used to create Options A and B for the above quantized by a factor of 2 examples. Note that the different overlapping quantizers individually have $2^{N-2}$ levels:

TABLE II

| | Dynamic Range Values | | | | | | | | | | | | |
|---|---|---|---|---|---|---|---|---|---|---|---|---|---|
| Original Signals | 0 | 1 | 2 | 3 | 4 | 5 | 6 | 7 | 8 | 9 | 10 | 11 | 12... |
| Quantized Signals | | | | | | | | | | | | | |
| Quant A | 0 | 0 | 0 | 0 | 4 | 4 | 4 | 4 | 8 | 8 | 8 | 8 | 12... |
| Quant B | 0 | 0 | 0 | 4 | 4 | 4 | 4 | 8 | 8 | 8 | 8 | 12 | 12... |
| Quant C | 0 | 0 | 4 | 4 | 4 | 4 | 8 | 8 | 8 | 8 | 12 | 12 | 12... |
| Quant D | 0 | 4 | 4 | 4 | 4 | 8 | 8 | 8 | 8 | 12 | 12 | 12 | 12... |

A spatially varying quantizer pattern such as that shown in FIG. 3 can be used with this quantized by a factor of 4 example where:
For sample locations where the x dimension index is even and the y dimension index is even use Quant A
For sample locations where the x dimension index is odd and the y dimension index is even use Quant B
For sample locations where the x dimension index is even and the y dimension index is odd use Quant C
For sample locations where the x dimension index is odd and the y dimension index is odd use Quant D Again note that the average quantization values, which can be determined be averaging Quant A, Quant B, Quant C, and Quant D values, are equal to the original signal values. A more complex pattern illustrated in FIG. 4, provides better reconstruction with the X/Y separable filter described in the reconstruction method Section 2.

Examples illustrating quantizing by factors equal to positive non-integral powers of two Typically, quantization is done by factors of positive integral powers of 2 (such as the quantizing by a factor of 2 and the quantizing by a factor of 4 in the examples above). This is primarily done since digital image signal data are most conveniently stored as bits and each factor of 2 would allow one less bit to be stored per sample. However, by storing more than one sample with an integral number of bits, or alternatively varying the number of bits stored at different sample locations, efficient storage of digitial image signal information with a non-integer number of bits, on the average, is achieved.

With spatially varying quantization, quantization by factors other than powers of 2, on the average, can be implemented. For example, values at certain sample locations may be quantized by a factor of 2, values at other sample locations may be quantized by a factor of 4, other values might not be quantized, etc. Alternatively, quantizing by any integer factor M can be accomplished by using M quantizers and spatially varying the implementation of these quantizers so that on average the dynamic range resolution of the original digital image signal is maintained. Examples of these methods are shown below.

EXAMPLE 4 (FIG. 5)

One-Dimensional Digital Image Signal Quantized by a Factor of 1.5

Table III shows how quantizing by a factor of 1.5, on the average, is achieved by spatially varying a single $2^N$ level quantizer with two $2^{N-1}$ level overlapping quantizers in the pattern shown in FIG. 5:

TABLE III

| | Dynamic Range Values | | | | | | | | | | |
|---|---|---|---|---|---|---|---|---|---|---|---|
| Original Signals | 0 | 1 | 2 | 3 | 4 | 5 | 6 | 7 | 8 | 9 | 10 | 11 etc. |
| Quantized Signals | | | | | | | | | | | |
| Q1.5-A | 0 | 1 | 2 | 3 | 4 | 5 | 6 | 7 | 8 | 9 | 10 | 11 etc. |
| Q1.5-B | 0 | 0 | 2 | 2 | 4 | 4 | 6 | 6 | 8 | 8 | 10 | 10 etc. |
| Q1.5-C | 0 | 2 | 2 | 4 | 4 | 6 | 6 | 8 | 8 | 10 | 10 | 12 etc. |

Note that in the reconstruction methods described below need only be applied to sample locations where Q1.5-B and Q1.5-C were used to quantize the digital image signal.

EXAMPLE 5 (FIG. 6)

Two-Dimensional Digital Image Signal Quantized by a Factor of 1.5

FIG. 6 illustrates a two-dimensional sampling pattern wherein the quantizers described in example 4 could be applied in a spatially varying manner to a two-dimensional image.

EXAMPLE 6

Two-Dimensional Digital Image Signal Quantized by a Factor of 5

Table IV shows how quantizing by a factor of 5 is achieved by spatially varying five $2^N$ divided by 5 level quantizers as shown in FIG. 7:

TABLE IV

| | Dynamic Range Values | | | | | | | | | | |
|---|---|---|---|---|---|---|---|---|---|---|---|
| Original Signals | 0 | 1 | 2 | 3 | 4 | 5 | 6 | 7 | 8 | 9 | 10 | 11 etc. |
| Quantized Signals | | | | | | | | | | | |
| Q5-A | 0 | 0 | 0 | 0 | 0 | 5 | 5 | 5 | 5 | 5 | 10 | 10 etc. |
| Q5-B | 0 | 0 | 0 | 0 | 5 | 5 | 5 | 5 | 5 | 10 | 10 | 10 etc. |
| Q5-C | 0 | 0 | 0 | 5 | 5 | 5 | 5 | 5 | 10 | 10 | 10 | 10 etc. |
| Q5-D | 0 | 0 | 5 | 5 | 5 | 5 | 5 | 10 | 10 | 10 | 10 | 10 etc. |
| Q5-E | 0 | 5 | 5 | 5 | 5 | 5 | 10 | 10 | 10 | 10 | 10 | 15 etc. |

Note that like the other examples, the average value of these five overlapping quantizers is equal to the value of the original signal. FIG. 7 illustrates how the quantizers are applied

EXAMPLE 7 (FIGS. 8 and 9)

Two-dimensional Digital Image Signal Quantized by a Factor of 3

Table V shows how quantizing by a factor of 3 is achieved by spatially varying three $2^N$ divided by 3 level quantizers as shown in FIGS. 8 and 9:

TABLE V

| | Dynamic Range Values | | | | | | | | | | |
|---|---|---|---|---|---|---|---|---|---|---|---|
| Original Signals | 0 | 1 | 2 | 3 | 4 | 5 | 6 | 7 | 8 | 9 | 10 | 11 etc. |
| Quantized Signals | | | | | | | | | | | |
| Q3-A | 0 | 0 | 0 | 3 | 3 | 3 | 6 | 6 | 6 | 9 | 9 | 9 etc. |
| Q3-B | 0 | 0 | 3 | 3 | 3 | 6 | 6 | 6 | 9 | 9 | 9 | 12 etc. |
| Q3-C | 0 | 3 | 3 | 3 | 6 | 6 | 6 | 9 | 9 | 9 | 12 | 12 etc. |

Note that like the other examples, the average value of these three overlapping quantizers is equal to the average value of the original signal. FIG. 8 illustrates how this quantize by a factor of three could be spatially implemented on a rectangular sampling grid. FIG. 9 illustrates how this quantize by a factor of 3 example could be spatially implemented in a pattern that mimics hexagonal sampling.

EXAMPLE 8

A Partial Quantization

Table VI shows two partially quantized quantizers which could be varied spatially as shown in FIG. 1 and/or 2. The quantizers in Table V are examples wherein a portion of the dynamic range values is more quantized and other portions of the dynamic range. Those skilled in the art will recognize that this example illustrates the dynamic range values that might result from a coring operation wherein values close to zero are mapped to zero to obtain compression of and/or noise reduction advantage for digital image signals with a zero mean:

TABLE VI

| | Dynamic Range Values | | | | | | | | | | |
|---|---|---|---|---|---|---|---|---|---|---|---|
| Original Signals | −5 | −4 | −3 | −2 | −1 | 0 | 1 | 2 | 3 | 4 | 5 etc. |

TABLE VI-continued

Dynamic Range Values

| Cored Signals | | | | | | | | | | | |
|---|---|---|---|---|---|---|---|---|---|---|---|
| C1.5A | −5 | −4 | −3 | −2 | 0 | 0 | 0 | 0 | 3 | 4 | 5 etc. |
| C1.5B | −5 | −4 | −3 | 0 | 0 | 0 | 0 | 2 | 3 | 4 | 5 etc. |

This "core by a factor of 1.5" example could benefit from the reconstruction method detailed in Section 2. Additional quantizers wherein original signal values ranging from 0 to 3 are mapped to a value of zero and/or original signal values of minus 3 to 0, are mapped to zero, etc. could be used in conjunction with C1.5A and C1.5B in more complex sampling patterns such as those shown in FIGS. 3 and 4.

Those skilled in the art recognize that coring is typically used to reduce the data load and/or the noise of a zero mean signal. The method of the present invention as detailed in Example 8 provides a method for coring, on the average, by integer and non-integer factors. This non-integer amount of coring is quite useful as the digital image signal quality difference between integer amounts of coring is quite large and an intermediate level might satisfy the digital image signal quality requirement while providing significant digital image signal data load compression. In addition, using the reconstruction method, described in Section 2, to reconstruct digital image signals that were cored with the spatially varying coring method can reduce the image signal quality degradations that result from excessive coring.

It is noted that all previous Examples 1 through 8 inclusive could be applied as part of a playback device wherein all of the dynamic range levels in the original signal cannot be reproduced by this playback device. This spatially varying quantization method allows the missing values, on the average, to be reproduced.

Note that in many image display devices, such as film recorders, CRTs, etc., the display spot size is designed to be greater than or equal to the sample spacing in order to achieve a continuous image signal. Therefore, this display aperture provides low pass filtering which may be sufficient to conceal the low amplitude high frequency pattern that can result from simply displaying, without utilizing the improvements described in the reconstruction method in Section 2, the results from the spatially varying quantization method.

SECTION 2

Reconstruction Methods

While the above described methods for spatially quantizing and reconstructing a digital image signal provide benefit (for example, playback devices wherein the number of reproducible levels is less than the number of levels in the digital image signal sent to this playback device) on their own, the following reconstruction method combines quantization and digital image signal processing to eliminate the low amplitude high frequency pattern that results (from spatially varying quantization) in areas of constant digital image signal value. This reconstruction method yields a digital image signal without contouring and the low amplitude high frequency pattern that results from the previously described quantization methods. This method also effectively generates a digital image signal with more levels than the digital image signal that results from the quantization method.

The essence of this reconstruction method is to low pass filter the spatially quantized digital image signal to remove the low amplitude high frequency pattern that can result from the spatially varying quantization. As noted above continuous display devices may have a display aperture that provides low pass filtering which may be sufficient to conceal this low amplitude high frequency pattern.

Further improvement in reconstructing the digital image signal, in particular, the high frequency information, can be realized by recognizing that the difference between the low passed quantized digital image signal and the quantized digital image signal should not exceed an absolute value of one-half of a quantization step. This fact can be utilized to limit the change between the quantized digital image signal and the low pass filtered version of this quantized digital image signal to no more than than an absolute value of one-half of a quantization step. Note that this reconstruction improvement does NOT require any knowledge of what quantizer was used at each sample location.

FIG. 10 is a flow diagram that illustrates this method. Blocks 1 through 4 of FIG. 10 correspond to the quantization method from Section 1 and Blocks 5 through 8 correspond to the reconstruction method. Block 1 corresponds to an original signal formed into a multi-level quantized digital image signal. The formed signals from Block 1 are reduced in the number of quantization levels by further quantizing, in a spatially varying manner in Block 2. The quantized digital image signal from Block 2, with L levels, can now be stored and/or transmitted, more easily than would be the case with the digital image signal from Block 1, with K levels, as indicated in Block 3. The digital image signal stored and/or transmitted from Block 3 is retrieved in Block 4. The essence of the above described reconstruction method begins in Block 5 where the retrieved digital image signals from Block 4 are low pass filtered. A difference between the digital image signals from Block 4 and Block 5 is formed in Block 6. The absolute value of this difference digital image signal from Block 6 is compared, in Block 7, to a value which equals one-half of the quantization step size used in Block 2. If the comparison performed in Block 7 indicates that the result from Block 6 is greater than one-half of the quantization level used in Block 2, then the retrieved digital image signal from Block 4 is selected as the preferred reconstructed digital image signal, Block 8A. If the comparison performed in Block 7 indicates that the result from Block 6 is less than or equal to one-half of the quantization level used in Block 2, then the low pass filtered digital image signal from Block 5 is selected as the preferred reconstructed digital image signal, Block 8B. Blocks 8A and 8B form Block 8, the reconstructed digital image signal for future use.

The performance of the above improvement is similar to, but different from, the method and apparatus disclosed in the previously referenced U.S. Pat. No.

4,334,237. The apparatus and method disclosed in U.S. Pat. No. 4,334,237 evaluate the original (non low passed) signal to make a decision on whether to low pass the original signal or not to low pass the original signal, while the above described method of the present invention low passes the entire original digital image signal and then evaluates this low passed digital image signal to make a decision whether to use the low passed digital image signal or the original (non low passed) digital image signal. Different results are achieved by these two different methods.

In yet a further improvement to this method (and the preferred embodiment of the present invention), which can be achieved with simple low pass filter implementations, the low pass filtered quantized digital image signal is "requantized" with the same quantization method used to quantize the original signal. If the "requantized" (that is quantized, low pass filtered, quantized) value does not equal the quantized value, the quantized, non low pass filtered value is used; otherwise the quantized and low pass filtered value is used. This method, shown by example below, preserves the quantized image in high frequency areas where the low amplitude high frequency pattern resulting from the spatially varying quantization will not be apparent, while removing this low amplitude high frequency pattern resulting from the spatially varying quantization from low frequency and more uniform areas of the digital image signal.

Figure 11:
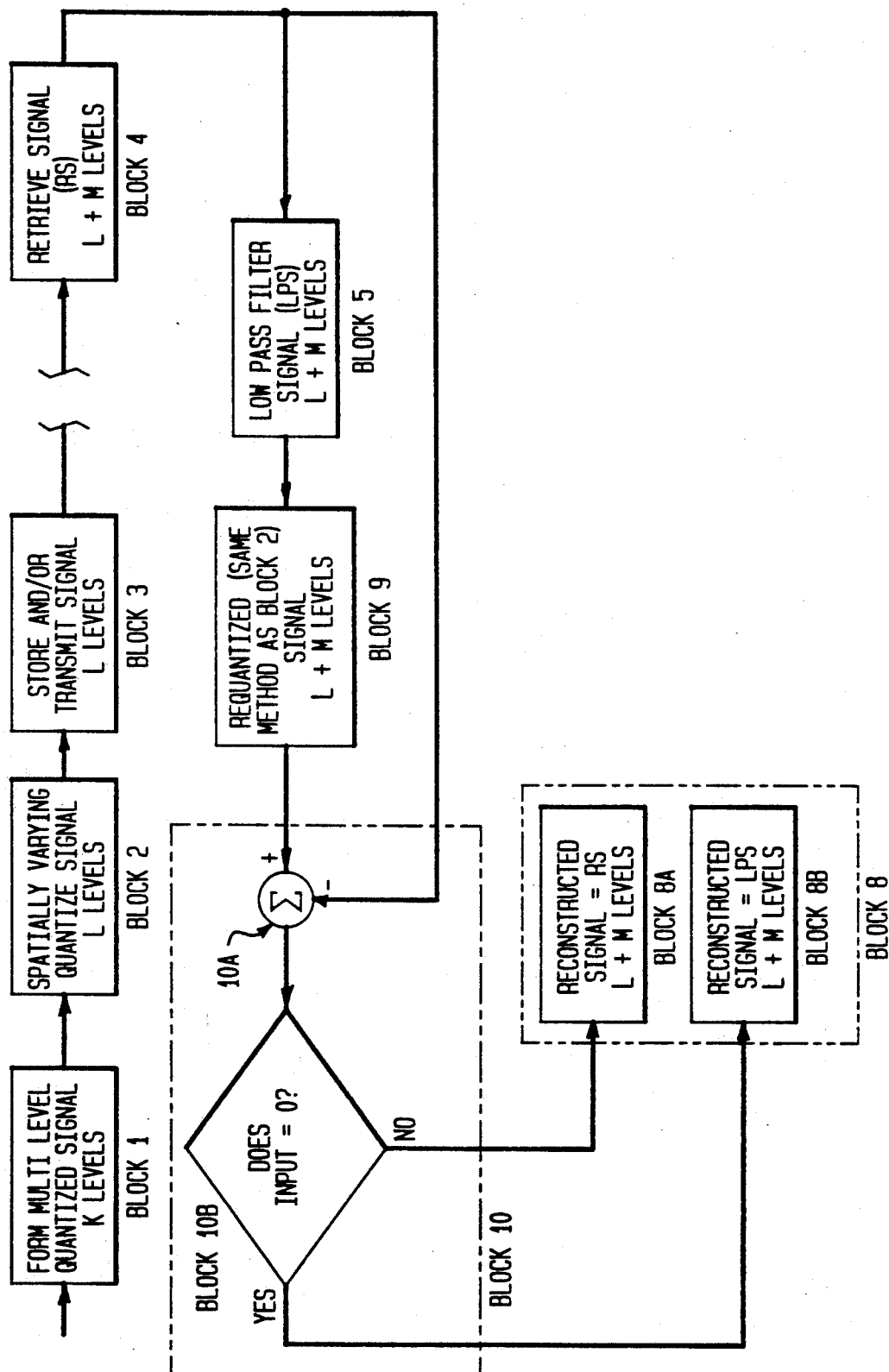
FIG. 11 is another process flow block diagram illustrating the preferred quantization reconstruction method.

FIG. 11 is a flow diagram that illustrates this preferred embodiment. FIG. 11 is similar to FIG. 10 in that Blocks 1 through 5 inclusive are identical in function to Blocks 1 through 5 inclusive as described above for FIG. 10. The remaining Blocks in FIG. 11 are described below. Block 9 corresponds to a digital image signal that results from requantizing the digital image signal from Block 5 with the identical spatially varying quantization manner that was used in Block 2. A difference digital image signal, between the digital image signal from Block 5 and the digital image signal in Block 9, is formed in Block 10A. The output from Block 10A is compared to zero in Block 10B. If the digital image signal in Block 10A does not equal zero then the digital image signal from Block 4 is selected as the preferred reconstructed digital image signal, Block 8A. If the digital image signal in Block 10A equals zero then the digital image signal from Block 5 is selected as the preferred reconstructed digital image signal, Block 8B. Blocks 8A and 8B form Block 8, the reconstructed digital image signal for future use.

As mentioned above, simple discrete low pass filters can be used, as part of these reconstruction methods, preferably with characteristics that produce:
1—Unity response at zero frequency to preserve gain
2—Zero phase shift
A simple one-dimensional low pass filter that has these characteristics is a [$\frac{1}{4}$, $\frac{1}{2}$, $\frac{1}{4}$] finite impulse response (FIR) filter. More complex FIR filters (more elements) to more effectively "notch" out the low amplitude high frequency pattern that results from spatially varying quantization, simpler filters (such as a two sample running average) that do not have both of the above characteristics, Infinite Impulse Response (IIR) filters, etc. could also be considered.

Note that the numerical precision of low pass filtering operation featured in the reconstruction method could produce a reconstructed digital image signal with a larger number of levels than the original digital image signal if this reconstructed digital image signal is allowed to have more quantization levels than the original digital image signal.

RECONSTRUCTION OF EXAMPLE 1

A detailed numerical example showing the quantization and reconstruction of a digital image signal quantized in the manner previously described in Example 1 is shown in FIG. 12.

Column I corresponds to an original signal formed into a multi-level quantized digital image signal. The formed digital image signal from Column I can be reduced in the number of quantization levels by further quantizing, in a spatially varying manner, as shown in Columns II through IV. Column II indicates the sample locations and digital image signal values where the Option A quantizer was used. Column III indicates the sample locations and digital image signal values where the Option B quantizer was used. Column IV corresponds to the spatially varying quantized digital image signal and represents the interleaving of the results from Columns II and III. Column V corresponds to the difference between Columns I and IV and is a measure of the quantization error resulting from the spatially varying quantization process. The formed digital image signal from Column IV is low pass filtered in Column VI. Column VII corresponds to the difference between Columns I and VII and is a measure of the error resulting from the combined processes of spatially varying quantization and low pass filtering. The formed digital image signal in Column VI is requantized, by the same method used in Columns II through IV, in Columns VIII through X. Column VIII indicates the sample locations and digital signal values where the Option A quantizer was used. Column IX indicates the sample locations and digital image signal values where the Option B quantizer was used. Column X corresponds to the spatially varying requantized digital image signal and represents the interleaving of the results from Columns VIII and IX. The digital image signal shown in Column XI corresponds to the preferred reconstruction values and locations selected from Column VI since the digital image signal value of Column X equals the digital image signal value of Column IV at these locations. The digital image signal shown in Column XII corresponds to the preferred reconstruction values and locations selected from Column VI since the digital image signal value of Column X does not equal the digital image signal value of Column IV at these locations. Column XIII corresponds to the spatially varying quantized digital image signal and represents the combining of the results from Columns XI and XII. Column XIV corresponds to the difference between Columns I and XIII and is a measure of the quantization error resulting from the spatially varying quantization and preferred reconstruction methods.

The average absolute value error and mean squared error statistics at the bottom of the columns where an error digital image signal was calculated are based on the middle 18 points of this 20 point sequence since the low pass filtering operation is not valid at the end points. Note that the first few samples of this digital image signal, where there are more errors, are high frequency information. The reconstructed values of the lower frequency samples of this digital image signal, at the bottom of FIG. 12, are almost error free. Also note that the requantization method in this reconstruction method requires information indicating which quantizer was used at each sample location. This is very little additional information to pass to a reconstruction device if, for example, the odd—even scheme is used to vary the quantizers.

RECONSTRUCTION OF EXAMPLE 2

A simple two-dimensional low pass Plus filter or an X/Y separable filter can be used in the reconstruction method for a digital image signal quantized in a spatially varying pattern as shown in FIG. 3:

| 0 | 1/8 | 0 | 1/16 | 1/8 | 1/16 |
|---|---|---|---|---|---|
| 1/8 | 1/2 | 1/8 | 1/8 | 1/4 | 1/8 |
| 0 | 1/8 | 0 | 1/16 | 1/8 | 1/16 |
| | Plus Filter | | | X/Y separable Filter | |

As with the above reconstruction, other FIR or IIR filters could be employed.

RECONSTRUCTION OF EXAMPLE 3

In this quantize by 4 example, implementing the spatially varying quantization will produce a high frequency pattern in low frequency areas, that varies by a value of 1 in the horizontal direction and a value of 2 in the vertical direction. The pattern is at the half sampling frequency in both directions and a simple low pass FIR filter, such as the separable filter in Example 2 can be used.

As mentioned above, the pattern in FIG. 4 provides good reconstruction with the X/Y Separable filter.

As with the above reconstructions, other FIR or IIR filters could be employed.

RECONSTRUCTION OF EXAMPLE 4

The preferred reconstruction method described above can be applied to the quantized digital image signal from Example 4 by applying the one-dimensional [$\frac{1}{4}$, $\frac{1}{2}$, $\frac{1}{4}$] FIR filter previously described. Note that this filter would only be applied at sample locations, indicated with B and C in FIG. 5, wherein the number of quantization levels was reduced.

RECONSTRUCTION OF EXAMPLE 5

A simple two-dimensional low pass Plus filter or an X/Y separable filter can be used in the reconstruction method of a digital image signal that was spatially varying quantized in a manner as shown in FIG. 6:

| 0 | 1/8 | 0 | 1/16 | 1/8 | 1/16 |
|---|---|---|---|---|---|
| 1/8 | 1/2 | 1/8 | 1/8 | 1/4 | 1/8 |
| 0 | 1/8 | 0 | 1/16 | 1/8 | 1/16 |
| | Plus Filter | | | X/Y separable Filter | |

Again note that a filter would only be applied at sample locations, indicated with B and C in FIG. 6, where the number of quantization levels was reduced.

RECONSTRUCTION OF EXAMPLE 6

A simple two-dimensional low pass filter, such as one of the filters shown below, can be used in the reconstruction method for a digital image signal quantized by a factor of 5 in a spatially varying pattern as shown in FIG. 7:

| 1/20 | 3/20 | 1/20 | 0 | 1/5 | 0 | 1/5 | 0 | 1/5 |
|---|---|---|---|---|---|---|---|---|
| 3/20 | 1/5 | 3/20 | 1/5 | 1/5 | 1/5 | 0 | 1/5 | 0 |

-continued

| 1/20 | 3/20 | 1/20 | 0 | 1/5 | 0 | 1/5 | 0 | 1/5 |
|---|---|---|---|---|---|---|---|---|

RECONSTRUCTION OF EXAMPLE 7

A simple two-dimensional low pass filter, such as one of the filters shown below, can be used in the reconstruction method for a digital image signal quantized by a factor of 3 in a spatially varying pattern as shown in FIG. 8:

| 1/18 | 5/36 | 1/18 | 0 | 1/6 | 0 |
|---|---|---|---|---|---|
| 5/36 | 2/9 | 5/36 | 1/6 | 1/3 | 1/6 |
| 1/18 | 5/36 | 1/18 | 0 | 1/6 | 0 |

RECONSTRUCTION OF EXAMPLE 8

The reconstruction described for Example 2 could be used to reconstruct a cored digital image signal formed from 2 spatially varying quantizers. The reconstruction described for Example 3 could be used to reconstruct a cored digital image signal formed from 4 spatially varying quantizers.

SECTION 3

Apparatus for the Preferred Method

Figure 13:
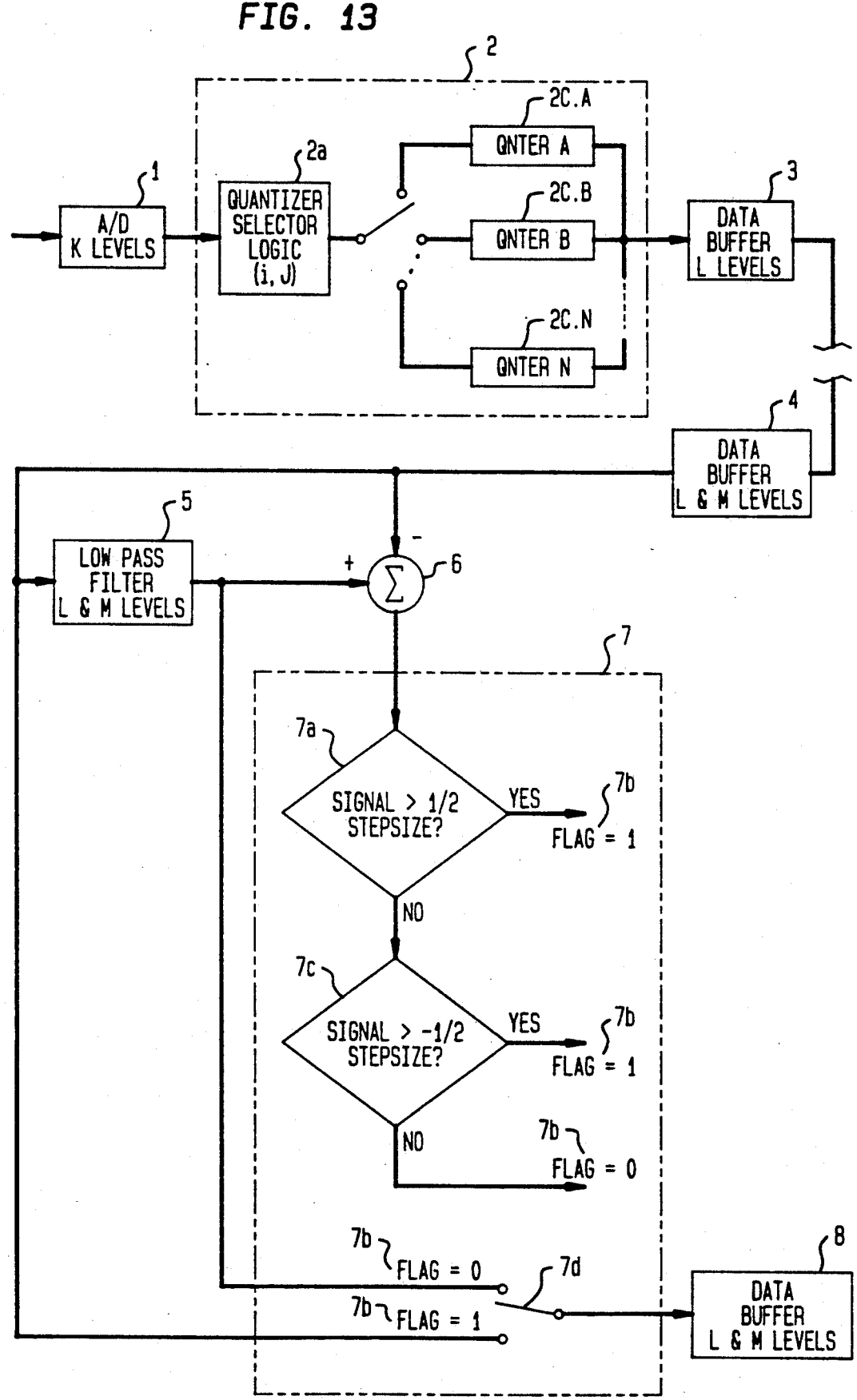
FIG. 13 is an apparatus diagram corresponding to the process flow block diagram in FIG. 10.

FIG. 13 is a diagram of an apparatus on which a preferred method may be implemented. The fundamental components of FIG. 13 correspond in numbers to the components in FIG. 10.

An analog signal is coupled to the input terminal of an analog to digital converter (A/D) 1. The K levels per sample output of the A/D converter 1, is coupled to the input of a spatially varying quantizer module 2, wherein 2a comprises the quantizer selector logic that utilizes the sample location indices (i,j) that represent a pixel location coordinates (i,j), to select from a plurality of L (L less than K) level overlapping quantizers, 2c.A, 2c.B, through 2c.N. The output of the selected overlapping quantizer forms the output of the varying quantizer module 2. The output of the spatially varying quantizer module 2, is coupled to the input an L level per sample data buffer, 3, for storing the spatially varying quantized digital image signals. The output of the storage data buffer 3, is transmitted to the input of a retrieved data buffer 4, with L+M levels stored per sample. Note that typically L+M approximately equals K. The output of the retrieved data buffer 4, is coupled to the input of a digital low pass filter, 5. The L+M level output of the low pass filter 5, and the negated output of the retrieved data buffer 4, are inputs to a summer 6. The output from this summer 6, is input to a selector module 7, wherein 7a tests to see if the output from the summer is greater than one-half the quantization step size used in the varying spatial quantizers 2c.A through 2c.N. If the result of the test in 7a is true (yes), then selector flag 7b is set to a value of 1. If the result of the test in 7a is false (no) then the input to 7a (that is the output from summer 6) is input 7c which tests to see if the output from the summer 6 is less than one half the negated quantization step size used in the varying spatial quantizers 2c.A through 2c.N. If the result of the test in 7c is true, then the selector flag 7b is set to a value of 1. If the result of the test in 7c is false, then the selector flag 7b is set to a value of 0. The selector flag 7b is used to control selector 7d so that the output of selector module 7 is the L+M level digital image signal from the output of retrieved data buffer 4 if selector flag 7b is equal to a value of 1 and so that the output of selector module 7 is the L+M level digital image signal from the output of the low pass filter 5, if selector flag 7b is equal to a value of 0. The output of selector module 7 is coupled to the input of an L+M level reconstructed digital image signal data buffer, 8, which stores the desired output for future use.

Figure 14:
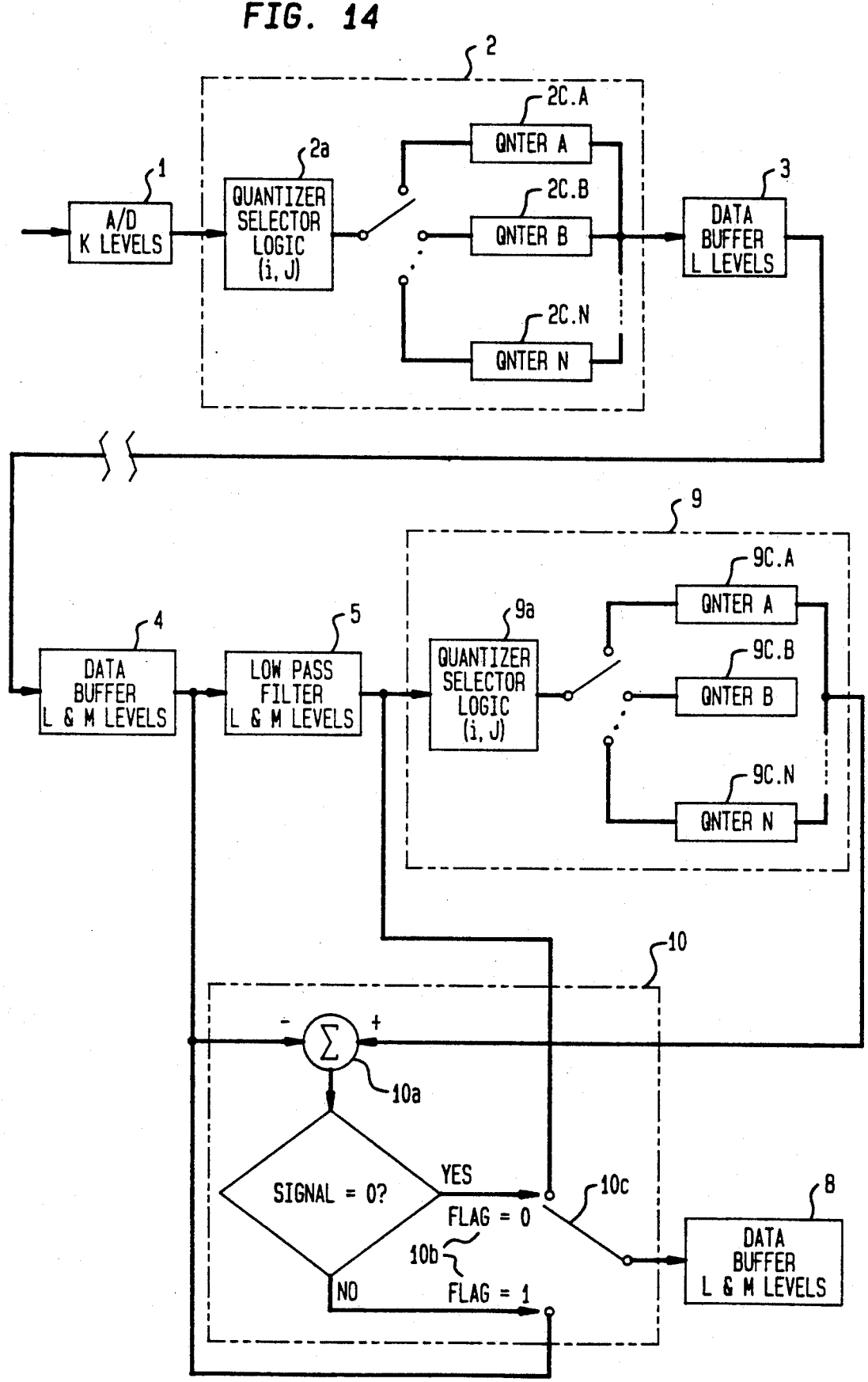
FIG. 14 is an apparatus diagram corresponding to the process flow block diagram in FIG. 11.

FIG. 14 is a diagram of an apparatus on which a preferred method may be implemented. The fundamental components of FIG. 14 correspond in numbers to the components in FIG. 11.

An analog signal is coupled to the input terminal of an analog to digital converter (A/D) 1. The K levels per sample output of this A/D converter 1, is coupled to the input of the spatially varying quantizer module 2, wherein 2a comprises the quantizer selector logic that utilizes the sample location indices (i,j) that represent pixel location coordinates (i,j), to select from a plurality of L (L less than K) level overlapping quantizers, 2c.A, 2c.B, through 2c.N. The output of the selected overlapping quantizer forms the output of the varying quantizer module 2. The output of the spatially varying quantizer module 2, is coupled to the input an L level per sample data buffer 3, for storing the spatially varying quantized digital image signals. The output of the storage data buffer 3, is transmitted to the input of the retrieved data buffer 4, with L+M levels stored per sample. Note that typically L+M approximately equals K. The output of the retrieved data buffer 4, is coupled to the input of a digital low pass filter 5. The L+M level output of the low pass filter 5, is coupled to the input of a spatially varying quantizer module 9, wherein 9a comprises the quantizer selector logic that utilizes the sample location indices (i,j), to select from a plurality of L (L less than K) level overlapping quantizers, referenced as 9c.A, 9c.B. through 9c.N. The output of the selected overlapping quantizer forms the output of the varying quantizer module 9. Note that the spatially varying module 9 is identical in all functional aspects to the spatially varying module 2. The output from the spatially varying module 9 is coupled to an input to the selector module 10. The output from the low pass filter 5 is coupled to another input to the selector module 10, wherein the negated output of the low pass filter 5 and the output of the spatially varying quantizer module 9 are inputs to an adder 10a. If the output of adder 10a equals 0, the selector flag 10b is set to a value of 0. If the output of adder 7a does not equal 0, the selector flag 10b is set to a value of 1. The selector flag 10b is used to control selector 10c so that the output of selector module 10 is the L+M level digital image signal from the output of retrieved data buffer 4 if selector flag 10b is equal to a value of 1 and so that the output of selector module 10 is the L+M level digital image signal from the output of the low pass filter 5 if selector flag 10b is equal to a value of 0. The output of selector module 10 is coupled to the input of an L+M level reconstructed digital image signal data buffer 8, which is the desired output for future use.

While there has been shown that are considered to be the preferred embodiments of the invention, it will be manifest that many changes and modifications may be made therein without departing from the essential spirit of the invention. It is intended therefore, in the annexed claims, to cover all such changes and modifications as may fall within the true scope of the invention.

I claim:
1. A method for quantizing multi-dimensional digital image signals comprising the steps of:
   a) forming a multi-leveled quantized digital image signal;
   b) reducing the number of quantization levels by further quantizing, in a spatially varying manner, the quantized digital image signal of step a) by selecting quantizers based upon the sample location indices value of each image pixel represented by said digital image signals, wherein each coordinate of each image pixel is a sample location indice value and by applying the quantized digital image signal to the selected quantizers;
   c) storing and/or transmitting the digital image signal resulting from step b);
   d) retrieving the digital image signal resulting from step c); and
   e) reconstructing the digital image from step d) in a manner that increases the number of levels in the digital image signal.
2. The method according to claim 1, wherein step b) is further comprised of the step of:
   i) quantizing in a spatially varying manner by providing overlapping quantizers that are applied in an odd-even alternating manner.
3. The method according to claim 1, wherein step b) is further comprised of the step of:
   i) quantizing in a two-dimensional spatially varying manner by applying overlapping quantizers in a manner where one quantizer is used when the sum of the sample location indices is even and another quantizer is used when the sum of the sample location indices is odd.
4. The method according to claim 1, wherein step b) is further comprised of the step of:
   i) quantizing in a two-dimensional spatially varying manner by applying a positive integral power of two number of overlapping quantizers such that these quantizers are applied to a two-dimensional pattern.
5. The method according to claim 1, wherein step b) is further comprised of the step of:
   i) quantizing in a two-dimensional spatially varying manner by applying a positive non-integral power of two integer number of overlapping quantizers such that these quantizers are applied to a two-dimensional pattern.
6. The method according to claim 1, wherein step b) is further comprised of the step of:
   i) quantizing in a spatially varying manner by applying overlapping quantizers in a random manner.
7. The method according to claim 1, wherein step b) is further comprised of the step of:
   i) quantizing in a multi-dimensional spatially varying manner by applying overlapping quantizers.
8. The method according to claim 1, wherein step e) is further comprised of the step of:
   i) low pass filtering the quantized, stored, and retrieved digital image signal of step d) to create a digital image signal with a larger number of quantization levels.
9. The method according to claim 8, wherein step e) is further comprised of the step of:
   I) comparing the quantized, stored, and retrieved image signal of step d), to the quantized, stored, retrieved, and low pass filtered digital image signal of step i) to determine a difference between the quantized, stored, retrieved, and low pass filtered digital image signal of step i) and the quantized, stored, and retrieved digital image signal of step d);

II) selecting the quantized, stored, and retrieved image signal of step d), as a preferred reconstructed digital image signal if the absolute value of said difference of step I) is greater than one half of a quantization level; and III) selecting the quantized, stored, retrieved, and low pass filtered digital image signal of step i), as a preferred reconstructed digital image signal if said absolute value of step II) is less than or equal to one half of a quantization level.

10. The method according to claim 8, wherein step e) is further comprised of the step of:

I) requantizing the quantized, stored, retrieved, and low pass filtered digital image signal of step i), with the quantization method of step b);

II) comparing the quantized, stored, and retrieved digital image signal of step d) to the quantized, stored, retrieved, low pass filtered, and requantized digital image signal resulting from step I) to determine a difference between the quantized, stored, retrieved, low pass filtered, and requantized digital image signal of step I) and the quantized stored, and retrieved digital image signal of step d);

III) selecting the quantized, stored, retrieved, and low pass filtered digital image signal of step i) as a preferred reconstructed digital image signal if the difference between the digital image signal from step i) and the digital image signal of step d) is equal to zero; and IV) selecting the digital image signal of step d) as a preferred reconstructed digital image signal if said difference of step II) is not equal to zero.

11. The method according to claim 1, wherein step b) is further comprised of the step of:

i) quantizing in a spatially varying manner where a positive non-integer number of bits per sample, on average, is achieved by using at least two quantizers which do not have the same number of quantization levels.

12. The method according to claim 1, wherein steps a) through e) inclusive are implemented for digital image signals with a plurality of spatial dimensions and/or multichannels.

13. The method according to claim 1, wherein step b) is further comprised of the step of:

i) quantizing a portion of the levels of step a) in a spatially varying manner.

14. The method according to claim 13 wherein the digital image signal of step a) is a zero mean digital image signal.

15. An apparatus for quantizing multi-dimensional digital image signals comprising:

a plurality of quantizing means each having a plurality of steps, for receiving a multi-level quantized image signal and for reducing the number of quantization levels by further quantizing said multi-level quantized image signal, in a spatially varying manner;

means for selecting quantizers from said plurality of quantizing means based upon the sample location indices value of each image pixel represented by said digital image signals, wherein the coordinate of each image pixel is a sample location indicia value means for receiving an output from said selected quantizing means and for storing and/or transmitting a digital image signal with a reduced number of quantization levels;

means for retrieving said stored and/or transmitted digital image signal; and means for reconstructing said retrieved digital image signal to a larger number of quantization levels.

16. The apparatus according to claim 15 wherein said quantizing means is comprised of:

at least one quantizers means;

means for activating a selected one of said at least one quantizer means in response to the multi-dimensional sample location indices.

17. The apparatus according to claim 15 wherein said storing means is comprised of:

a data buffer means comprised of a plurality of levels per sample.

18. The apparatus according to claim 15 wherein said retrieving means is comprised of:

a data buffer means comprised of a at least plurality of levels per sample.

19. The apparatus according to claim 15 wherein said reconstructing means is comprised of:

means for low pass filtering said retrieved digital image signal;

means for requantizing the digital image signal from said low pass filtering means;

means for forming a difference between the digital image signal from said requantizing means and the digital image signal from said retrieving means;

means for selecting the digital image signal from said low pass filtering means if said difference is equal to zero; and means for selecting the digital image signal from said retrieving means if said difference is not equal to zero.

20. The apparatus according to claim 19 wherein said quantizing means and said requantizing means are identical in operation.

21. The apparatus according to claim 15 wherein said reconstructing means is comprised of:

means for low pass filtering said retrieved digital image signal;

means for forming a difference between the digital image signal from said low pass filtering means and the digital image signal from said retrieving means;

means for selecting the digital image signal from said low pass filtering means if said difference is not greater than one-half of the step size in said quantizing means and said difference is not less than one-half the negative of the step size in said quantizing means; and means for selecting the digital image signal from said retrieving means if said difference is greater than one-half of the step size in said quantizing means or said difference less than one-half the negative of the step size in said quantizing means.

* * * * *

UNITED STATES PATENT AND TRADEMARK OFFICE
CERTIFICATE OF CORRECTION

PATENT NO. : 5,210,623
DATED : May 11, 1993
INVENTOR(S) : J.A. Weldy

It is certified that error appears in the above-indentified patent and that said Letters Patent is hereby corrected as shown below:

Claim 18, column 18, line 3, delete "of a at least plurality of" and insert therfor, —of a plurality of—.

Signed and Sealed this

Thirteenth Day of September, 1994

Attest:

BRUCE LEHMAN

Attesting Officer    Commissioner of Patents and Trademarks